Dec. 12, 1933.　　　C. F. JENKINS　　　1,939,172
MAPPING CAMERA
Filed April 15, 1929　　　6 Sheets-Sheet 1
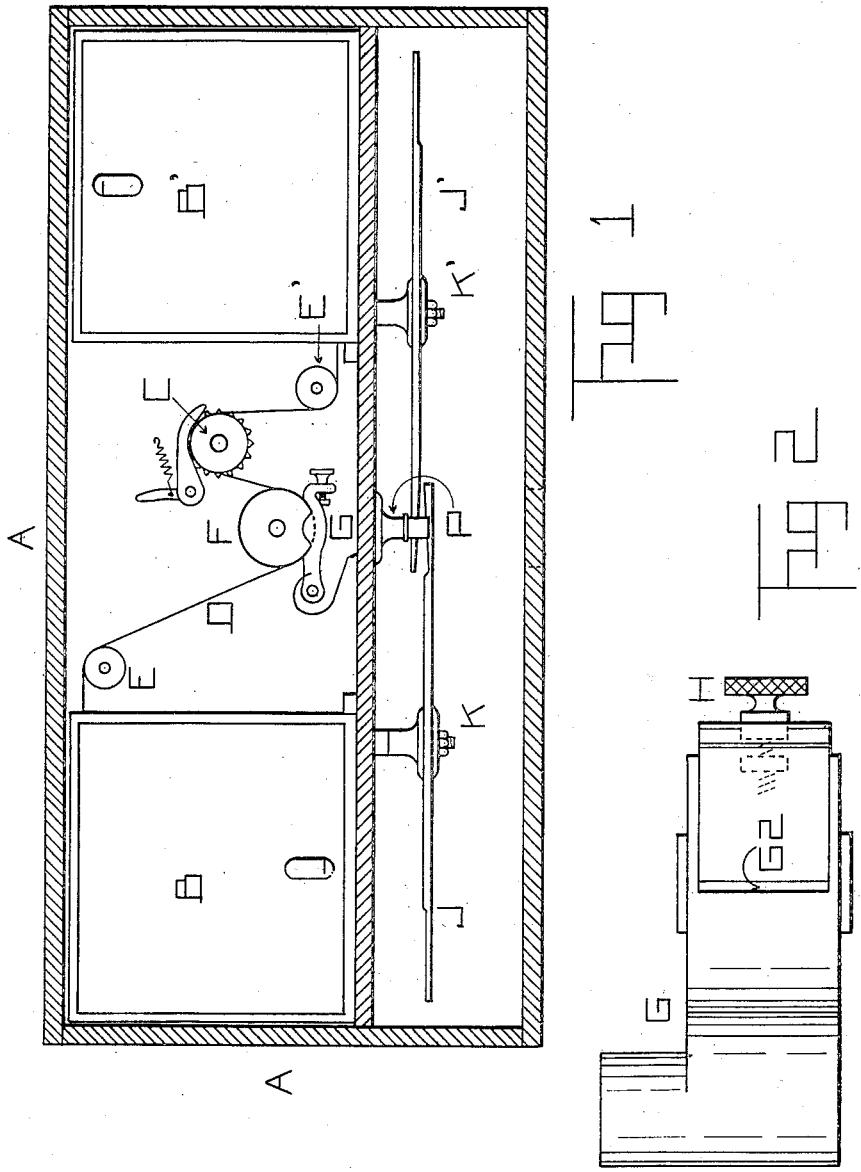
Witness:
Florence M. Anthony.
Inventor
C. Francis Jenkins Dec. 12, 1933.  C. F. JENKINS  1,939,172
MAPPING CAMERA
Filed April 15, 1929   6 Sheets-Sheet 2
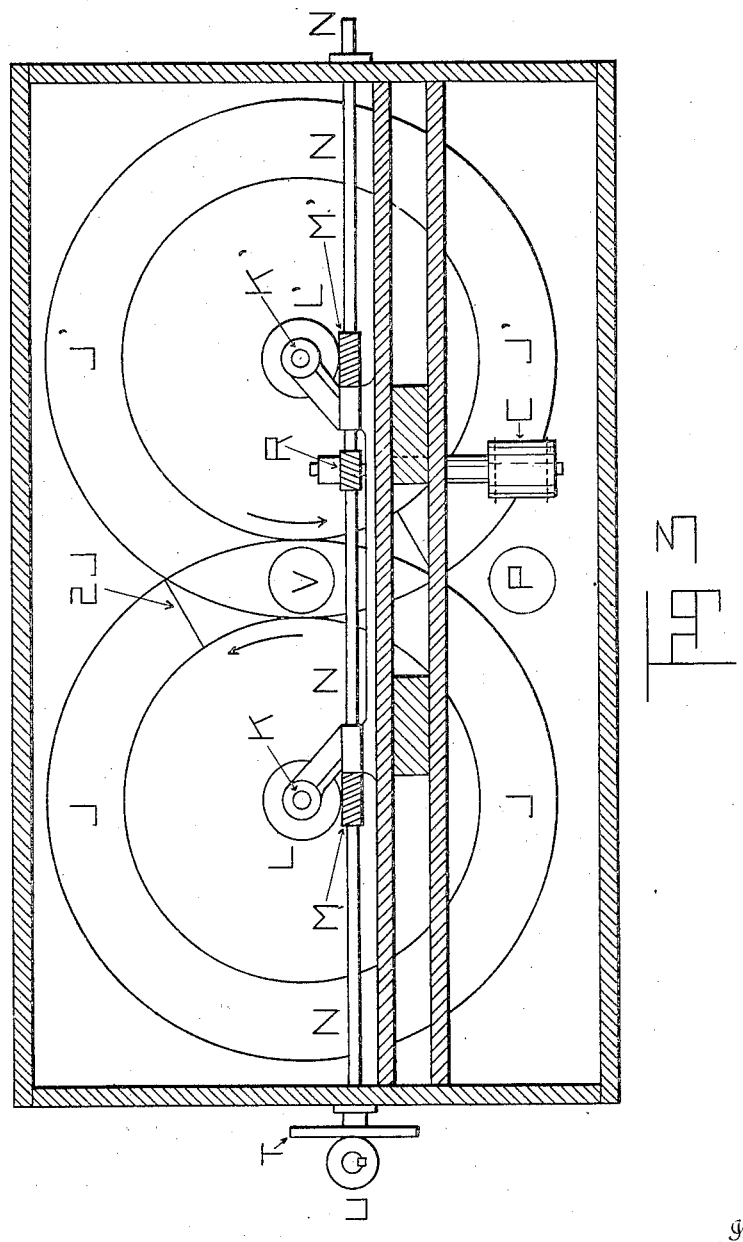
Witness:
Florence M. Anthony.
Inventor
C. Francis Jenkins Dec. 12, 1933.                C. F. JENKINS                 1,939,172
                              MAPPING CAMERA
                           Filed April 15, 1929         6 Sheets-Sheet 3
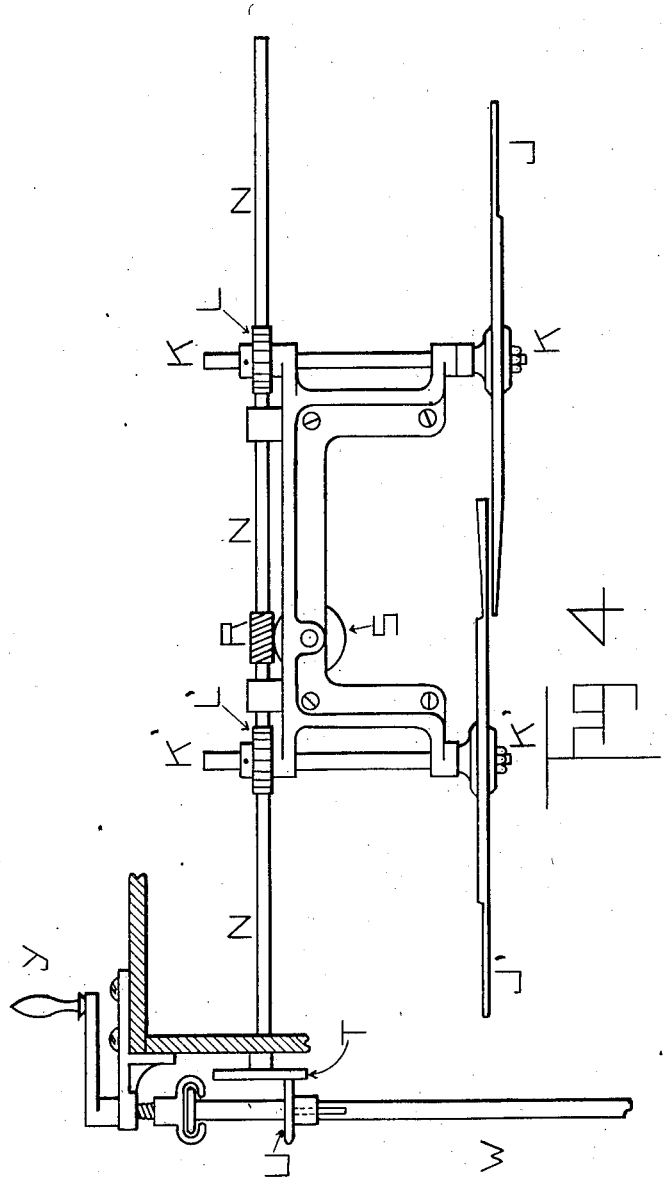

Dec. 12, 1933.   C. F. JENKINS   1,939,172
MAPPING CAMERA
Filed April 15, 1929   6 Sheets-Sheet 4
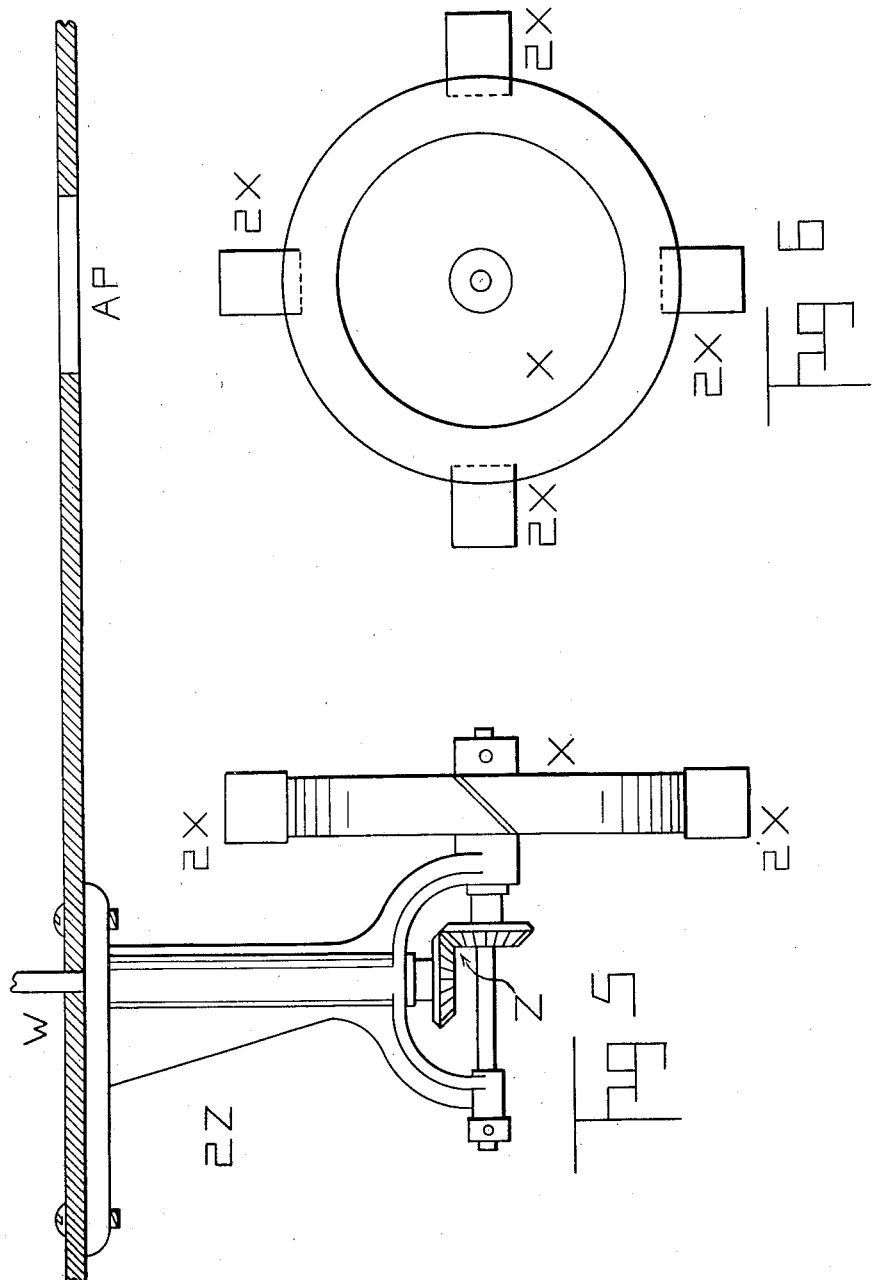

Dec. 12, 1933.  C. F. JENKINS  1,939,172
MAPPING CAMERA
Filed April 15, 1929    6 Sheets-Sheet 5
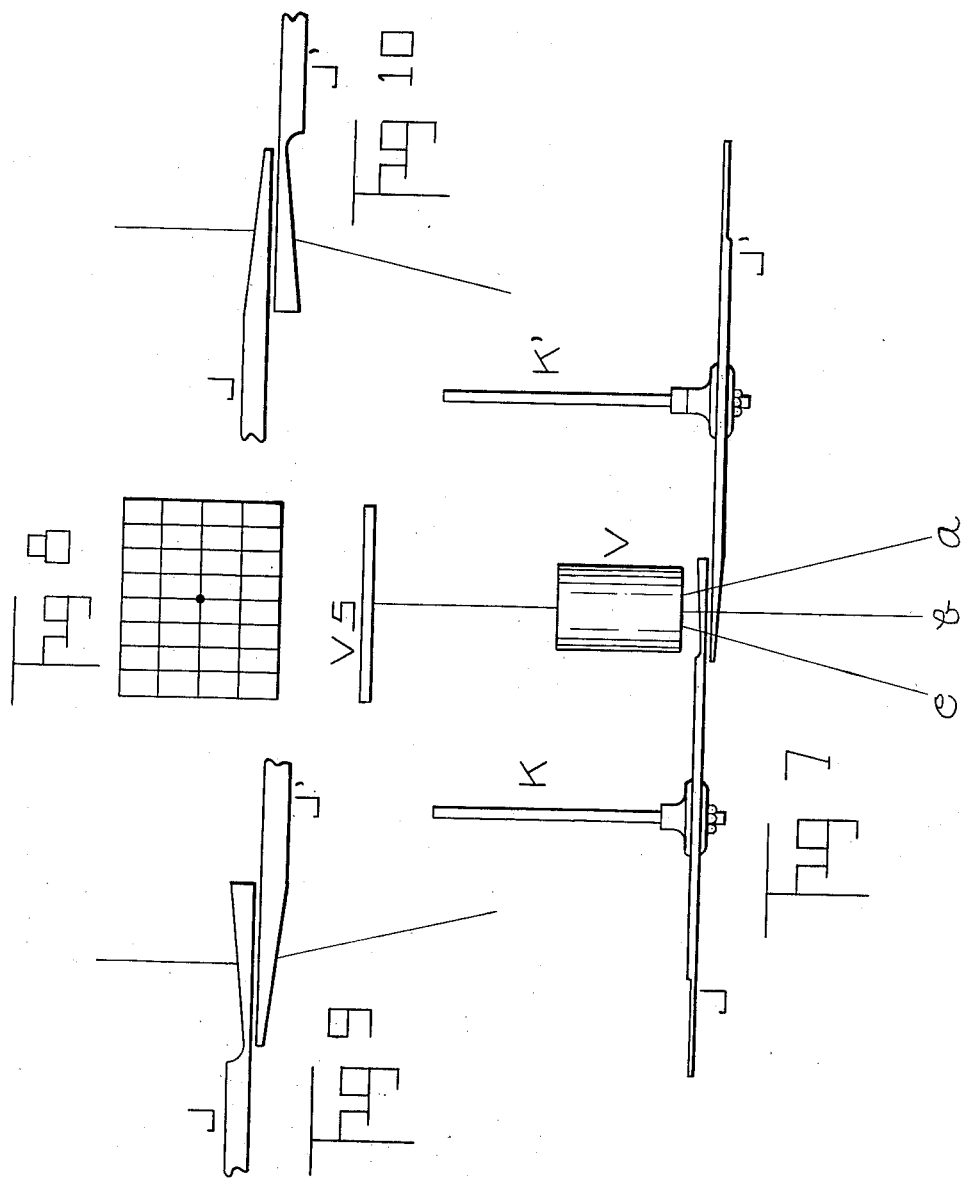

Dec. 12, 1933.   C. F. JENKINS   1,939,172
MAPPING CAMERA
Filed April 15, 1929   6 Sheets-Sheet 6
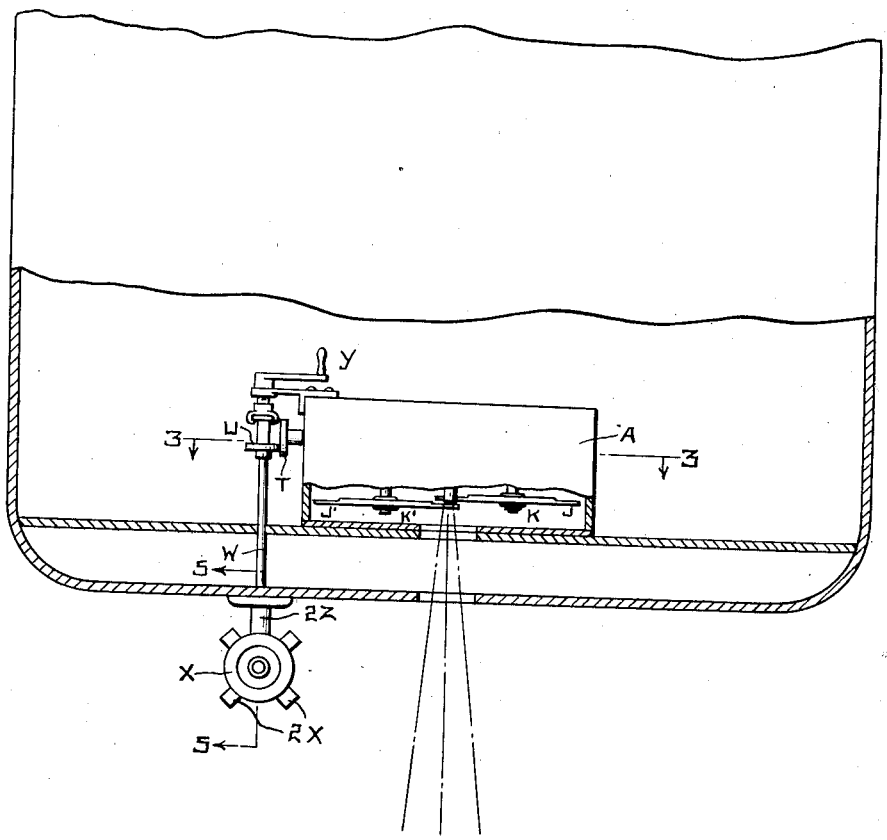
Inventor
C. Francis Jenkins,
By
Attorney

UNITED STATES PATENT OFFICE 1,939,172

MAPPING CAMERA

Charles Francis Jenkins, Washington, D. C., assignor to C. Francis Jenkins, Inc., Washington, D. C.

Application April 15, 1929. Serial No. 355,387

7 Claims. (Cl. 88—16.8)

This invention relates to aerial photography, and has for its principal object means for making a single photographic map of the terrain between any two distant points, even though the points may be many hundreds of miles apart.

A second object is to secure such a record in an inexpensive manner; easily and rapidly recorded; impossible of disarrangement; and ready for reproduction in enlarged projection.

The method of aerial photography heretofore practiced consists of a succession of "stills" approximately square made on separate, detached negatives. From these negatives prints are made, then matched and the overlap trimmed away, so that, pasted together, the separate prints represent the terrain flown over.

But as this method consists of a grouping of prints made from distinctly separated exposure positions, distortion can not be entirely avoided.

The method herein described photographs the terrain in, practically, an infinite number of closely adjacent positions, so that distortion is entirely avoided in the photographic record; and an involved expense of about one-tenth of one percent of the cost of the former method.

It is also easy to project this photographic strip so that those viewing it get the same continuous panoramic view of the scenery, over which the plane was flown, as though they rode in the plane. Such projection gives all the sensation of an actual flight-study of the same territory, and with a fidelity not possible by any other method.

With these and other objects in view, the invention consists of the novel combination of elements herewith illustrated, described in the specifications, and particularly pointed out in the claims.

In the drawings, Figure 1 is an elevation of the film-feeding mechanism, the casing being in section; Figure 2 a detail thereof; Figure 3 a horizontal sectional view taken substantially on the line 3—3 of Fig. 11 showing the pair of prismatic rings and supporting and driving mechanism; Figure 4 a detail of the driving mechanism and frame carrying same; Figure 5 is a detail vertical sectional view on the line 5—5 of Fig. 11; Figure 6 a front view of the motor propeller; Figures 7, 8, 9 and 10 diagrammatic drawings illustrating the operation of the translation-neutralizing mechanism; and Fig. 11 is an elevation partly in section showing the mapping camera applied to the body of an airplane.

In the several figures, like symbols refer to like parts; and in which A is a casing enclosing the mechanism; B and B' film boxes or magazines; C a sprocket for pulling the film D from box B and permitting a uniform rewind in box B'. Rollers E and E' are supports and guides for the film. Large roller F provides a support for the film at the point of exposure, above the photographic lens P. A film clamp arm G holds the film snugly against the exposure roller F. Arm G has an exposure slot G2 therein (Figure 2), which is adjustable in width by the screw H.

J and J' are prismatic rings (Patent #1,385,-325), the characteristics of which are explained later. These prismatic rings are mounted on shafts K and K' respectively. The shafts also have gears L and L' thereon, and which engage worms M and M' on shaft N. A third worm R engages a gear S to rotate sprocket C. On the end of shaft N is a friction faced wheel T, with which driver disc U contacts, splined to slide longitudinally on shaft W, to change the driver-to-driven ratio, by the rotation of handle Y.

In Figures 5 and 6, X is a heavy wheel with diagonally-set veins 2X therein. The rotation of the wheel (by air striking the veins) is translated into rotation of the shaft W, through bevel gears Z. The assembly is supported in frame 2Z intended to be bolted to the underside of the fuselage of the plane, aft of the aperture AP through which lenses P and V look downward. The lens V as illustrated in Fig. 3 of the drawings is located in rear of the photographic lens P. The aperture AP is relatively long as illustrated in Fig. 5 of the drawings and is of sufficient length to extend from the lens P to the lens V and to expose to both of these lenses the terrain over which the plane is flying. The screen or grating V5 is located above the lens V as illustrated in Fig. 7 of the drawings. The image as indicated in Fig. 7 of the drawings first passes through the prisms J and J' then through the lens V to the ground plate and the grating or screen V5. These parts of the neutralizing means are located in rear of the photographic lens P.

The operation of the camera is as follows:— The film box B, having been loaded with negative film, is put into position in the camera, and the film "threaded" over rollers E and F, sprocket C and roller E', and then attached to the usual rewind spool in box B' placed at the right in the camera.

The plane then being put in flight, the air striking against the blades 2X of the motor starts same rotating, and this in turn rotates shaft W. But if driver wheel U is in a position in alignment with the centre of disc T no motion is imparted thereto.

However, shifting the position of the driver U away from the centre of disc T by turning the handle Y starts the disc T to rotating, the shaft N, and all the mechanism attached thereto, resulting in a longitudinal movement of the film over the exposure slot G2 (Figure 2), above the photo lens P.

Similarly the mechanism rotates the prismatic rings J and J' which tends to slow up the visual image on the ground plate and grating V5. The adjustment of wheel U by turning handle Y is continued until the image of objects below (on the ground), cease movement on the plate V5, which is evidence that the photo film and the object image thereon are in exact synchronism, that is, have no relative movement.

The characteristics of the prismatic ring (Patent No. 1,385,325), and its effect in rotation on a beam of light, is now rather well known, though perhaps a brief description may not be out of place here.

Each of the glass discs, i. e., J and J', have a ring or annular prism ground in one face near the edge, giving a prism section on any radius, the prism-angle maximum on one side of zero radius, i. e., 2J, having the base of the prism at the periphery, and the prism-angle maximum on the other side of the same zero radius having the point of the prism at the periphery. A beam of light incident on the rotating prism ring has, therefore, an oscillating motion of the emerging beam, as described in detail in the said patent and as the construction and operation of the annular prisms are explained in detail in the said patent further description and illustration thereof are deemed unnecessary.

The reverse is also true, i. e., that an oscillating beam of light, with the apex of oscillation resting on the face of the rotating prism emerges as a fixed beam of light when the prism rotation is adjusted to the period of oscillation of the incident beam. This latter is the principle employed in this invention.

For certain advantages the prisms are often overlapped, as in Figures 9 and 10, which obviously permits following the oscillation through twice the angle of a single prism. As the prisms rotate the incident beam will be in position shown in Figure 9, and at approximately a complete rotation in the position shown in Figure 10.

If, therefore, with the prism speed of rotation correctly proportionate to the ground speed of the plane, any object sighted, for example, a house, a tree, or the like, will appear on the screen as in Figure 8 from position $a$ (Figure 7) on the ground, and will not move from that position on the screen while it passes to position $b$ and final position $c$.

Of course, the object sighted on may not, and probably would not, be in the centre of the screen, Figure 8, but this is unimportant, as all objects in the ground-view image seem to be at rest on the screen for each revolution of the prismatic rings, and it is this phenomena which gives the desired information; namely, that the film is moving across exposure aperture G2 at exactly the same speed as ground objects imaged thereon by the lens P, resulting in a sharp image, when the film is developed.

With an adequate supply of film negative the exposure can go on during an entire day's flight, the film required being but about one-hundredth part as much length as would be required for the same flight employing a motion picture camera.

It will be observed that the result is not a "motion picture" composed of sixteen hundred separate "frames" per hundred feet of film, each frame a discrete picture, but is a single "still" one hundred feet long by one inch wide. The fact that a print therefrom can be projected as a panorama picture is a result of the plane's flight, not a result of the camera construction alone.

It is a new method of photography in which a strip of photographic film is drawn across a narrow exposure aperture at a rate varied to suit the variable ground speed of the plane resulting from changing wind direction, engine speed, or other causes.

While the description of the method herein set forth refers to airplanes, it is obvious that any other transport vehicle in motion might be employed if it were suited to the subject to be photographed.

The method consists primarily in moving a light-sensitive surface past a limiting aperture at exactly the image movement rate of objects having relative movement with respect to said aperture.

It is also obvious that other uses may be found for this new principle, which consists in its simplest form, of a constantly moving image-receiving surface carried by an airplane in flight, suitable means for imaging ground objects on said receiving surface, and means for varying the speed of the surface to bring the surface and the image into co-incident movement.

What I claim is—

1. In a camera adapted to be carried by an airplane in flight and having a downwardly directed exposure aperture, the combination of means for supporting a strip of photographic film, means for giving the film continuous longitudinal movement, means for imaging on the film the terrain over which the plane is flying, means for simultaneously visually imaging the said terrain, means for neutralizing the visual image movement, and means for automatically applying the said neutralizing correction to the movement of the film, to give the film and the image thereon simultaneous movement at the point of incidence.

2. In a camera adapted to be carried by an airplane in flight and having a downwardly directed exposure aperture, the combination of means for supporting and continuously exposing a strip of photographic film at the said aperture, means for continuously imaging on the film the terrain over which the airplane is flying, and means for giving the film and image synchronous movement at the point of image incidence, whereby a continuous still picture is photographed.

3. In a camera adapted to be carried by an airplane in flight and having a downwardly directed exposure aperture, the combination of means for supporting and continuously exposing a strip of photographic film at the said aperture, means for giving the film continuous longitudinal movement, and means for adjusting the movement of the film proportionate to the ground speed of the plane, whereby a continuous still picture is photographed.

4. In a camera adapted to be carried by a moving vehicle, the combination of means for supporting and continuously exposing a constantly moving image receiving surface, means for projecting an object-image thereon, and adjusting means for producing simultaneous movement between the image receiving surface and the incident object-image, whereby a continuous still picture of the terrain over which the vehicle is moving is photographed.

5. In operable combination, a mask having a downwardly directed aperture, means for constantly moving a light sensitive surface past said aperture, means for continuously imaging on the light sensitive surface the terrain over which the plane is flying, and means located on the opposite side of said aperture from the sensitive surface for giving the light sensitive surface and image synchronous movement at the point of image incidence, whereby a continuous still picture is photographed.

6. In a camera adapted to be carried by a moving vehicle, the combination of a mask having an exposure aperture, means for supporting a light sensitive surface and for continuously moving the same past said aperture and for exposing the light sensitive surface at said aperture, means for simultaneously moving an object image across said aperture on the opposite side of said aperture from the light sensitive surface, and means for giving the light sensitive surface and image synchronous movement at the point of image incidence, whereby a continuous still picture is photographed.

7. In a camera adapted to be carried by a moving vehicle, the combination of a mask having an exposure aperture, means for moving an object image across said aperture, means located on the opposite side of said aperture for supporting and for continuously exposing a light sensitive surface at said aperture and for continuously moving said light sensitive surface across said aperture, and means for giving the light sensitive surface and image synchronous movement at the point of image incidence, whereby a continuous still picture is photographed.

CHARLES FRANCIS JENKINS.